Dec. 6, 1927.

F. J. NEMETHY, JR 1,651,405

AUTOMOBILE SHIPPING DEVICE

Filed Nov. 3, 1924

INVENTOR
Frank J. Nemethy Jr.
BY
Blackmore, Spencer & Fleet
ATTORNEYS

Patented Dec. 6, 1927.

1,651,405

UNITED STATES PATENT OFFICE.

FRANK J. NEMETHY, JR., OF DETROIT, MICHIGAN.

AUTOMOBILE SHIPPING DEVICE. REISSUED

Application filed November 3, 1924. Serial No. 747,531.

This invention relates to the shipment of automobiles in frieght cars, and is illustrated as embodied in novel supports arranged to hold an automobile at a sufficient height to permit the blocking of a second automobile for shipment below the one so supported. An object of the invention is to provide a strong support while at the same time allowing ample clearance for the lower automobile, by using supporting devices or "decks" including vertical legs carrying horizontal arms extending inwardly to carry the load, so that the decks on opposite sides of the automobile are spaced apart far enough to give the necessary clearance for the lower automobile. In the form shown in the drawings, the horizontal arm supports one end of one of the axles by engagement with the wheel hub and is braced by an inclined member extending from its free end downwardly to the vertical legs.

The above and other objects and features of the invention, including various novel details of construction, will be apparent from the following description of one illustrative embodiment shown in the accompanying drawings, in which.

Figure 1:
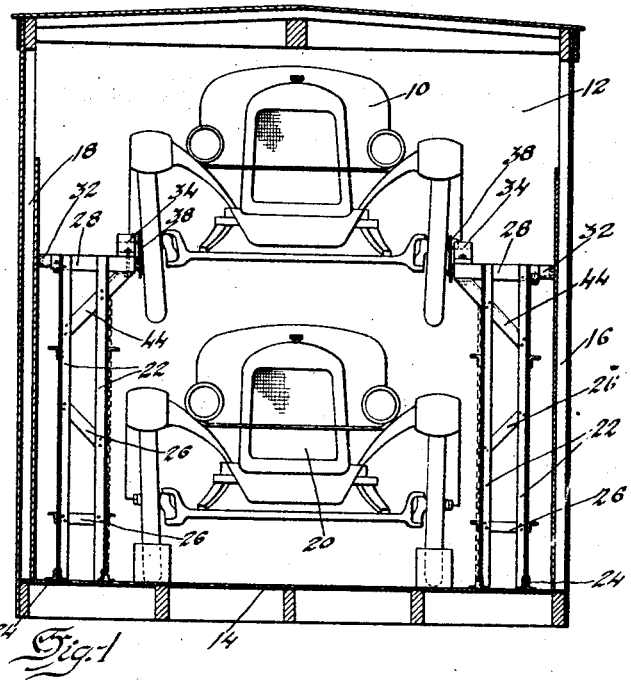
Figure 1 is a vertical transverse section through a box car showing upper and lower automobiles ready for shipment with the upper automobile carried by my novel decks.
Figure 3:
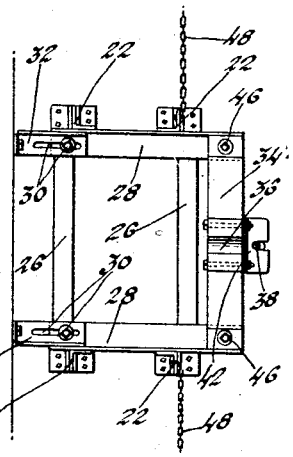
Figure 3 is a top plan view of the deck.
Figure 2:
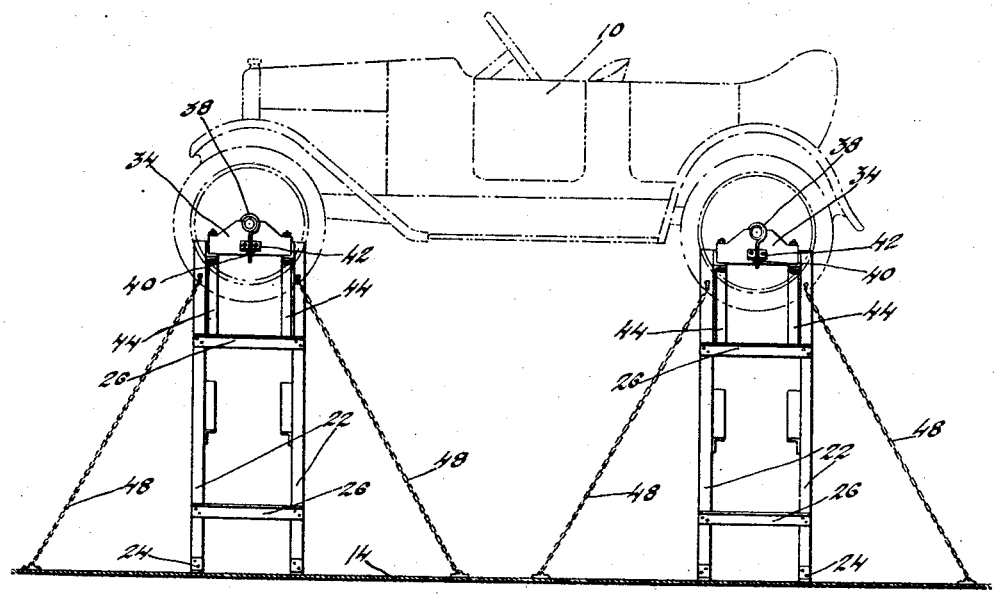
Figure 2 is a side elevation of two of the decks on the same side of the automobile, with the position of the automobile indicated in dot-and-dash lines.

In the arrangement selected for illustration, the decks are used to carry an upper automobile 10 in a box car 12 having a floor 14 and side walls 16 and 18, the automobile 10 being supported in the upper part of the box car with clearance beneath for a second automobile 20. The upper automobile is supported by four novel racks or "decks", illustrated as being built up out of angle iron parts, and each of which supports one hub of the automobile so that the four decks taken together form a support for the automobile which permits more or less relative movement during shipment on account of the movements due to the automobile springs, etc., without loosening any of the securing means. That is to say, no two of these racks are rigidly connected so that they may move slightly independently of one another.

Each rack is shown as having four vertical legs 22, each having riveted thereto at the bottom angle fittings 24 to be nailed to the floor of the freight car. The vertical legs are securely connected by suitable transverse pieces 26 of angle iron. Each pair of legs of the rack carries at its upper end a horizontal arm 28, to which is adjustably secured by a bolt-and-slot connection 30, a continuation 32, having a flanged end to be nailed or otherwise secured to the side wall 16 or 18 of the freight car. At their inner ends the arms 28 are connected by a transverse block 34, shown as being made of wood, which is recessed at 36 to receive one of the hubs of the automobile. The hub is prevented from coming out of the recess 36 by a hook 38 which encircles the hub and which is held by a nut 40 engaging a bracket 42 bolted to the block 34 and formed with a slot for the lower end of the hook. Each block 34 is additionally supported by inclined braces 44 riveted to the vertical legs 22 and terminating below the free end of the corresponding horizontal arm 28. In the arrangement shown, this permits use of a single bolt 46 at each end of the block 34 passing through the block and through the ends of arm 28 and brace 44. Tension members 48, shown as flexible chains, are secured to the upper ends of legs 22 and to the floor 14.

While one illustrative embodiment of the invention has been described in detail, it is not my intention to limit its scope to that particular embodiment, or otherwise than by the terms of the appended claims.

I claim:

1. Automobile supporting means for use in freight cars comprising four racks, one for each end of each axle of the automobile, and each of which consists of a plurality of vertical supporting legs, the legs of opposite racks being spaced far enough apart transversely of the automobile to permit a second automobile to be run between them, horizontal arms projecting inwardly from the top ends of the legs to form a horizontal offset, and devices carried by the inner ends of the horizontal arms and which are constructed and arranged to support the hubs of the automobile.

2. Automobile supporting means for use in freight cars comprising four racks, one for each end of each axle of the automobile, and each of which consists of a plurality of vertical supporting legs, horizontal supporting means carried by the supporting legs and extending beyond the legs at both sides, the supporting means being formed at one end for attachment to the side wall of the freight car, and a device carried by the other end of the supporting means for supporting one end of one axle of the automobile.

In testimony whereof I affix my signature.

FRANK J. NEMETHY, Jr.